Patented Oct. 23, 1951

2,572,302

UNITED STATES PATENT OFFICE 2,572,302

PRODUCTION OF ARYLHALOSILANES

Arthur J. Barry, Midland, Mich., assignor to Dow Corning Corporation, Midland, Mich., a corporation of Michigan No Drawing. Application October 16, 1948, Serial No. 55,023. In Great Britain December 4, 1947

7 Claims. (Cl. 260—448.2)

1

This invention relates to the manufacture of aromatic halosilanes. It is particularly concerned with an improved process for the manufacture of an organohalosilane in which one valence of the silicon atom is satisfied by direct linkage to a carbon atom in a benzenoid hydrocarbon.

The preparation of phenyltrichlorosilane from benzene and trichlorosilane by interacting these materials at an elevated temperature in vapor phase has been described in the literature. In this type of process, phenyltrichlorosilane is not produced at temperatures of 500° C. and below.

I have shown in my copending application Serial No. 784,076 filed jointly with De Pree and Hook that interaction between benzene and trichlorosilane is obtained to a limited extent at temperatures above 288.5° C. and under a pressure above the critical pressure of benzene.

Benzene and methyldichlorosilane may be reacted to produce phenylmethyldichlorosilane as has been shown in U. S. Patent No. 2,510,853, granted to me jointly with De Pree and Hook. The reaction proceeds under pressure, with a yield of phenylmethyldichlorosilane. However, due to side reactions when a polyhalomonohydrosilane such as methyldichlorosilane is heated at temperatures in the order of 300° C. or higher, by-products such as methyltrichlorosilane are obtained. Accordingly, when it is desired to obtain phenylmethyldichlorosilane the problem involved is one of controlling preferentially the rates of desired reaction and such side reactions.

Objects of the present invention are to provide an improved process for effecting interaction of benzenoid hydrocarbons and polyhalomonohydrosilanes; for the production of aromatic organohalosilanes in high yield; and for the production of bis(silyl) benzene compounds.

In accordance with the present invention, a benzenoid hydrocarbon is reacted with an organodichloromonohydrosilane in the presence of a boron halide, at a temperature above 150° C. under sufficient pressure that at least a portion of the reaction mixture is in a condensed phase. Under these conditions, organodichlorosilyl derivatives of the hydrocarbon constitute a major portion of the reaction product.

Benzenoid hydrocarbons with which this invention is concerned include benzene, polyphenyls, and alkyl substituted benzenes, such as toluene, xylene, cumene and mesitylene. Inasmuch as cracking of side chains may be obtained with such materials as cumene and relatively pure products are obtained when the side chains con-

2 tain but one carbon atom each, it is preferred to employ benzene, a polyphenyl, or the methyl derivatives of benzene as the hydrocarbon.

Organodichloromonohydrosilanes which are suitable for use in this process are compounds of silicon having the general formula $RHSiCl_2$ in which R represents a monovalent hydrocarbon radical such as an alkyl or aryl radical. Preferred reactants are methyldichlorosilane and phenyldichlorosilane.

The boron halide may be added as such, in the form of boron trichloride or trifluoride, or it may be produced in situ by the addition of materials such as boric acid. The boron halide is preferably employed in a proportion of at least 0.1 per cent and generally less than 5 per cent, based on the total weights of the reactants, though larger proportions may be employed if desired. The catalyst is readily separable from the reaction product.

The process of the present invention is operable over a wide range of proportions of organodichloromonohydrosilane and hydrocarbon in the reaction mixture. However, based upon economics and the law of mass action, it is preferable to have less than 20 mols of either of the reactants per mol of the other reactant.

When it is desired to direct the process toward the production of monosilyl derivatives of the benzenoid hydrocarbon, it is preferable to operate with approximately equimolecular ratios of the silane and the hydrocarbon. For example, an equimolecular mixture of methyldichlorosilane and benzene yields a preponderance of methylphenyldichlorosilane, and minor proportions of bis(methyldichlorsilyl) benzene.

The use of mixtures which contain more than one molecular equivalent of the silane per mol of hydrocarbon result in an increase in the amount of polysilyl derivatives of the hydrocarbon. Thus, with these larger proportions of the silane, substantially increased amounts of bis- and tris-silyl benzenes are obtained without appreciable decrease in the amount of the monosilyl benzene produced.

In a preferred form of the present invention, the reaction mixture is heated at a temperature above 150° C. At temperatures above 420° C. no advantage over conducting the reaction without the catalyst is obtained. In the range between 150° and 300° C. optimum results are obtained with respect both to the per cent yield and to the ratio of organic silane derivatives to by-product. The pressure employed should be sufficient to ensure that at the temperature of operation at least a portion of the reaction mixture is in a condensed phase. Thus, when the operation is conducted at a temperature below the critical temperature of the hydrocarbon the pressure should be sufficient to maintain some liquid phase. When the temperature is above the critical temperature of the hydrocarbon the pressure should be at least the critical pressure thereof whereby a condensed phase is present, though present day knowledge of the nature of this state is incomplete. This may be accomplished in various ways, such as by introducing the reactants continuously into the reaction zone under pressure, or by operating under autogenous pressure in a closed system. The indicated phase condition is obtained when there is employed at least 1.2 gram mols of reactants per liter of reactor volume.

The following examples illustrate how the process of the invention may be carried into effect.

*Example 1*

A mixture of 1402 grams benzene, 2070 grams methyldichlorosilane and 37 grams boron trichloride was heated in a 14.4 liter bomb for 16 hours at an average temperature of 300° C. During the heating period, the maximum pressure attained within the bomb was 1160 pounds per square inch. The bomb was then cooled, and the product was fractionally distilled. 215 grams of phenylmethyldichlorosilane and 1309 grams of residual material distilling at temperatures above 200° C. at atmospheric pressure were obtained. This distillation residue contained bis(methyldichlorosilyl)benzene. Methyltrichlorosilane, dimethyldichlorosilane and phenyltrichlorosilane were also obtained in minor amounts.

*Example 2*

A mixture of 234 grams benzene, 345 grams methyldichlorosilane and 13 grams boron trichloride was heated in a 2.4 liter bomb for 16 hours at an average temperature of from 280° to 288° C. The maximum pressure attained within the bomb during the heating period was 1140 pounds per square inch.

Fractional distillation of the reaction product yielded 49.9 grams phenylmethyldichlorosilane and 162.9 grams of residue which contained bis-(methyldichlorosilyl)benzene.

*Example 3*

A mixture of 1402 grams benzene, 2070 grams methyldichlorosilane and 40 grams boron trifluoride was heated in a 14.4 liter bomb for 16 hours at an average temperature of 300° C., during which time the maximum pressure attained within the bomb was 1100 pounds per square inch. The reaction product contained phenylmethyldichlorosilane and bis(methyldichlorosilyl)benzene.

*Example 4*

A mixture of 1402 grams benzene, 2070 grams methyldichlorosilane and 36 grams boron trichloride was heated in a 14.4 liter bomb for 16 hours at an average temperature of 203° C. During the heating period the maximum pressure attained within the bomb was 620 pounds per square inch.

Fractional distillation of the reaction product yielded 1035 grams phenylmethyldichlorosilane and 381 grams of residual material which contained poly(methyldichlorosilyl)benzene.

*Example 5*

A mixture of 1402 grams benzene, 2070 grams methyldichlorosilane and 37 grams boron trichloride was maintained at an average temperature of 182° C. for 16 hours in a 14.4 liter bomb. During the heating period the maximum pressure attained within the bomb was 450 pounds per square inch.

Fractional distillation of the product yielded 771 grams phenylmethyldichlorosilane.

*Example 6*

A mixture of 1402 grams benzene, 2070 grams methyldichlorosilane and 38 grams boron trichloride was maintained at an average temperature of 160° C. for 16 hours in a 14.4 liter bomb. The maximum pressure attained within the bomb during this period was 260 pounds per square inch.

Fractional distillation of the reaction product yielded 427 grams phenylmethyldichlorosilane, and 175 grams of distillation residue which contained hydrolyzable organochlorosilanes.

*Example 7*

A mixture of 3120 grams benzene, 2300 grams methyldichlorosilane and 61 grams boron trichloride was heated at an average temperature of 200° C. for 16 hours in a 14.4 liter bomb. During this time the maximum pressure attained within the bomb was 950 pounds per square inch.

Fractional distillation of the reaction product yielded phenylmethyldichlorosilane.

*Example 8*

A mixture of 1560 grams benzene, 4600 grams methyldichlorosilane and 61 grams boron trichloride was maintained at an average temperature of 202° C. for 16 hours in a 14.4 liter bomb. During this period the maximum pressure attained within the bomb was 980 pounds per square inch.

Fractional distillation of the reaction product yielded phenylmethyldichlorosilane.

*Example 9*

A mixture of 510 grams benzene, 71 grams diethylbenzene, 579 grams phenyldichlorosilane, and 12 grams boron trichloride was heated for 16.5 hours at an average temperature of 200–210° C. in a 2.4 liter bomb. During the heating period, the maximum pressure attained within the bomb amounted to 670 pounds per square inch.

Fractional distillation of the reaction product yielded 210 grams diphenyldichlorosilane and 219 grams of residual material which contained bis-(phenyldichlorosilyl)benzene, and diethylphenyl phenyl dichlorosilane.

*Example 10*

A mixture of 1402 grams benzene, 2070 grams methyldichlorosilane and 370 grams boron trichloride was heated in a 14.4 liter bomb for 16 hours at an average temperature of 187° C. The maximum pressure attained within the bomb during the heating period was 600 pounds per square inch. Phenylmethyldichlorosilane was obtained as product.

*Example 11*

A mixture of 1656 grams toluene, 2070 grams methyldichlorosilane and 42 grams boron trichloride was maintained at an average temperature of 250° C. in a 14.4 liter bomb for 16 hours, during which time the maximum pressure attained within the bomb was 700 pounds per square inch.

Fractional distillation of the reaction product yielded 812 grams tolylmethyldichlorosilane and 587 grams of residue which contained methyldichlorosilyl derivatives of toluene.

*Example 12*

A mixture of 1656 grams toluene, 2070 grams methyldichlorosilane and 39 grams boron trichloride was heated in a 14.4 liter bomb at an average temperature of 206° C. for 16 hours. During this time the maximum pressure developed within the bomb was 630 pounds per square inch.

Fractional distillation of the reaction product yielded 1003 grams tolylmethyldichlorosilane, and 430 grams of residue containing methylditolylchlorosilane and compounds having the general formula

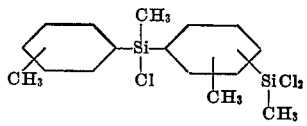

*Example 13*

A mixture of 1656 grams toluene, 2070 grams methyldichlorosilane and 40 grams boron trichloride was heated in a 14.4 liter bomb at an average temperature of 186° C. for 16 hours, during which time the maximum pressure attained within the bomb was 450 pounds per square inch.

Fractional distillation of the reaction product yielded 873 grams tolylmethyldichlorosilane, and 182 grams of distillation residue which contained bis(methyldichlorosilyl) toluene.

*Example 14*

A mixture of 3300 grams toluene, 2060 grams methyldichlorosilane and 53.6 grams boron trichloride was heated in an 18.9 liter autoclave for 19 hours at from 140° C. to 158° C. The maximum pressure attained within the autoclave during the heating period was 250 pounds per square inch. The reaction product was fractionally distilled.

The yield of tolylmethyldichlorosilane was 29.6 of that theoretically possible.

*Example 15*

A mixture of 2772 grams biphenyl, 2070 grams methyldichlorosilane and 77 grams boron trichloride was heated in a 14.4 liter bomb at an average temperature of 201° C. for 16 hours, during which time the maximum pressure attained within the bomb was 675 pounds per square inch.

Fractional distillation of the reaction product yielded 718 grams of a biphenylylmethyl dichlorosilane, and a residue which contained higher boiling isomers thereof, together with various isomeric bis(methyldichlorosilyl) biphenyls.

In each of the above examples unreacted hydrocarbon and silane were recovered.

That which is claimed is:

1. A process which comprises reacting a benzenoid hydrocarbon free of aliphatic unsaturation in any side chains with an organodichloromonohydrosilane, of the general formula RHSiCl₂ in which R represents a monovalent hydrocarbon radical free of aliphatic unsaturation, in the presence of a boron halide at a temperature above 150° C., at least a portion of the reaction mixture being in condensed phase, whereby to produce an organodichlorosilyl derivative of the benzenoid hydrocarbon.

2. A process which comprises reacting a benzenoid hydrocarbon free of aliphatic unsaturation in any side chains with an organodichloromonohydrosilane, of the general formula RHSiCl₂ in which R represents a monovalent hydrocarbon radical free of aliphatic unsaturation, in the presence of a boron halide at a temperature of from 150° to 420° C., at least a portion of the reaction mixture being in condensed phase, whereby to produce an organodichlorosilyl derivative of the hydrocarbon.

3. The process which comprises reacting a benzenoid hydrocarbon free of aliphatic unsaturation in any side chains with methyldichlorosilane in the presence of a boron halide at a temperature of from 150° to 420° C., at least a portion of the reaction mixture being in condensed phase, whereby to produce a methyldichlorosilyl derivative of the hydrocarbon.

4. The process which comprises reacting benzene with methyldichlorosilane in the presence of boron chloride at a temperature of from 150° to 420° C., at least a portion of the reaction mixture being in condensed phase, whereby to produce phenylmethyldichlorosilane.

5. The process which comprises reacting toluene with methyldichlorosilane in the presence of boron chloride at a temperature of from 150° to 420° C., at least a portion of the reaction mixture being in condensed phase, whereby to produce tolylmethyldichlorosilane.

6. The process which comprises reacting biphenyl with methyldichlorosilane in the presence of boron chloride at a temperature of from 150° to 420° C., at least a portion of the reaction mixture being in condensed phase, whereby to produce biphenylylmethyldichlorosilane.

7. The method which comprises reacting a benzenoid hydrocarbon free of aliphatic unsaturation in any side chains with an organodichloromonohydrosilane of the general formula RHSiCl₂ in which R represents a monovalent hydrocarbon radical free of aliphatic unsaturation in the presence of a boron halide at a temperature of 250°–420° C. in a closed system under autogenous pressure, whereby to produce an organodichlorosilyl derivative of the hydrocarbon.

ARTHUR J. BARRY.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 30, 1946 |
| 2,407,181 | Scott | Sept. 3, 1946 |
| 2,443,898 | Ellingboe | June 22, 1948 |

OTHER REFERENCES

A. L. Clark: Chem. Revs. 23, 1–15 (1938).

O. Maass: Chem. Revs. 23, 17–27 (1938).

McIntosh and Maass: Can. J. Research B16, 289–302 (1938).

Holder and Maass: Can. J. Research B16, 453–67 (1938).

Bradley, Browne and Hale: Phys. Rev. 26, 470–482 (1908).